United States Patent
Wang (10) Patent No.: US 9,367,506 B2
(45) Date of Patent: Jun. 14, 2016

(54) EXECUTIVE DEVICE AND CONTROL METHOD AND ELECTRONIC SYSTEM THEREOF

(71) Applicant: ACCTON TECHNOLOGY CORPORATION, Hsinchu (TW)

(72) Inventor: Yu-Chien Wang, Tainan (TW)

(73) Assignee: ACCTON TECHNOLOGY CORPORATION, Hsinchu (TW)

( * ) Notice: Subject to any disclaimer, the term of this patent is extended or adjusted under 35 U.S.C. 154(b) by 394 days.

(21) Appl. No.: 13/925,838

(22) Filed: Jun. 25, 2013

(65) Prior Publication Data

US 2014/0195707 A1    Jul. 10, 2014

(30) Foreign Application Priority Data

Jan. 10, 2013   (TW) .............................. 102100944 A (51) Int. Cl.
*G06F 13/40* (2006.01)
(52) U.S. Cl.
CPC .................................. *G06F 13/4068* (2013.01)
(58) Field of Classification Search
CPC  G06F 13/4068; G06F 13/4081; G06F 9/4413
USPC ................ 710/8–10, 104, 302, 110
See application file for complete search history.

(56) References Cited

U.S. PATENT DOCUMENTS

| 8,346,977 B2* | 1/2013 | Zeng .................... G06F 13/4282 710/110 |
| 8,473,663 B2* | 6/2013 | Somervill ........... G06F 13/4095 710/110 |
| 2004/0107334 A1 | 6/2004 | Hatte |
| 2005/0289269 A1* | 12/2005 | Nakayama ............ G06F 13/409 710/110 |
| 2006/0195639 A1* | 8/2006 | Yang .................... G06F 13/4291 710/110 |
| 2009/0144471 A1* | 6/2009 | Lin ...................... G06F 13/4252 710/110 |
| 2009/0177820 A1 | 7/2009 | Ranade et al. |
| 2009/0210596 A1* | 8/2009 | Furuya ................ G06F 13/4247 710/110 |
| 2010/0100200 A1 | 4/2010 | Kim et al. |
| 2014/0032802 A1* | 1/2014 | Sip ........................ G06F 13/385 710/110 |
| 2014/0047132 A1* | 2/2014 | Sip ...................... G06F 13/4095 710/2 |
| 2014/0223054 A1* | 8/2014 | Hasan ................. G06F 13/1605 710/110 |

FOREIGN PATENT DOCUMENTS

| CN | 201035349 Y | 3/2008 |
| CN | 100385872 C | 4/2008 |
| CN | 102523141 A | 6/2012 |

(Continued)

*Primary Examiner* — Glenn A Auve
(74) *Attorney, Agent, or Firm* — CKC & Partners Co., Ltd.

(57) ABSTRACT

A stack method for executive devices includes the following steps: a present master-slave setting is detected of each execution device, such that the execution device is respectively set as a master device and a slave device. The master device generates coding information. It is detected if another execution device is connected successively to the current execution device, so as to process the coding information. If there is another execution device connected successively to the current execution device, the current execution device generates following coding information according to its coding information and writes the following coding information to the successive execution device as its coding information. If there is no execution device connected successively, the current execution device replies its coding information to the master device as end coding information.

16 Claims, 3 Drawing Sheets

(56) References Cited

FOREIGN PATENT DOCUMENTS

| TW | I221968 B | 10/2004 |
| TW | I235577 B | 7/2005 |
| TW | 201142864 A | 12/2011 |
| TW | 201301047 A | 1/2013 |

* cited by examiner

EXECUTIVE DEVICE AND CONTROL METHOD AND ELECTRONIC SYSTEM THEREOF

RELATED APPLICATIONS

This application claims priority to Taiwan Application Serial Number 102100944, filed Jan. 10, 2013, which is herein incorporated by reference.

BACKGROUND

1. Field of Invention

The present invention relates to an executive device, a stack method and a stack system thereof. More particularly, the present invention relates to an executive device for identifying a stack status and executing an instruction, as well as a stack method and a stack system thereof.

2. Description of Related Art

Currently, an executive device having a micro-controller or a system on chip is usually connected to a host such as a personal computer (PC) for operation via a connection interface such as a USB (Universal Serial Bus) or a RS-232 (Recommended Standard number 232).

However, the conventional RS-232 interface cannot realize the stack connection between multiple executive devices, i.e. the serial connection between several executive devices. The USB protocol is highly complex, and a compatible driver is required to be additionally developed on the host side, which is time-consuming and requires the host to be equipped with quite many USB connection ports in order to connect multiple executive devices at the same time.

SUMMARY

Therefore, the present invention provides a stack method for executive devices, which is applied to an instruction device and at least one executive device. The stack method includes the following steps: (a) a connection status is detected of each executive device to confirm a present master-slave setting of each executive device, such that the executive devices are respectively set as a master device and a slave device; (b) the master device generates a coding information; (c) it is determined that if there is another execution device connected successively to the current executive device, wherein: if there is another executive device connected successively to the current executive device, the master device initially generates a following coding information according to its coding information and writes the following coding information to the successive execution device as its coding information; and if there is no execution device connected successively to the current executive device, the current executive device replies its coding information to the master device as an end coding information.

The present invention further discloses a stack system for executive devices and an executive device. The stack system includes an instruction device and more than one executive device. The executive device described in the present invention includes a first pin, a second pin, a third pin, a first data pin, a second data pin, a memory unit, and a processing unit. The processing unit of each executive device is connected to the memory unit, the first pin, the second pin, the third pin, the first data pin, and the second data pin of the executive device. Among the executive devices, one executive device directly connected to the instruction device is a master device, and the rest executive devices are slave devices. The instruction device includes a connection pin and a data pin. The first pin and the first data pin of the master device are respectively connected to the connection pin and the data pin of the instruction device. The second pin of the master device is connected to the third pin of the slave device. The second data pin of the master device is connected to the first data pin of the slave device. The processing unit of the master device generates a coding information and stores the coding information in the memory unit of the master device. The second pin of the current slave device is connected to the third pin of another slave device, and the second data pin of the current slave device is connected to the first data pin of the another slave device.

The processing unit of each executive device detects the first pin to set each executive device as a master device or a slave device, and correspondingly updates a master-slave information stored in the memory unit of each executive device. Each processing unit further detects the second pin to confirm if there is another execution device connected successively to the current execution device. Beginning from the master device among the executive devices, the processing unit of each executive device generates a following coding information according to its coding information, and, via the second data pin of the current executive device, transmits the following coding information to the first data pin of another executive device connected successively. The processing unit of the other executive device connected successively receives and stores this following coding information in its memory unit as its coding information. If there is no execution device connected successively, the processing unit of the current execution device replies its coding information to the master device and the master device stores the coding information in the memory unit of the master device as an end coding information.

In the present invention, the connection and the auto-setting of master-slave settings of all serially stacked executive devices can be implemented simply, without using complex communication protocols, such as the USB protocol. In addition, an instruction host device can simply command multiple successively connected and serially stacked executive devices to simultaneously execute the instruction according to the master-slave setting, only by configuring a single connection interface to connect to one of the executive devices, without using multiple connection interfaces.

DETAILED DESCRIPTION

Figure 1:
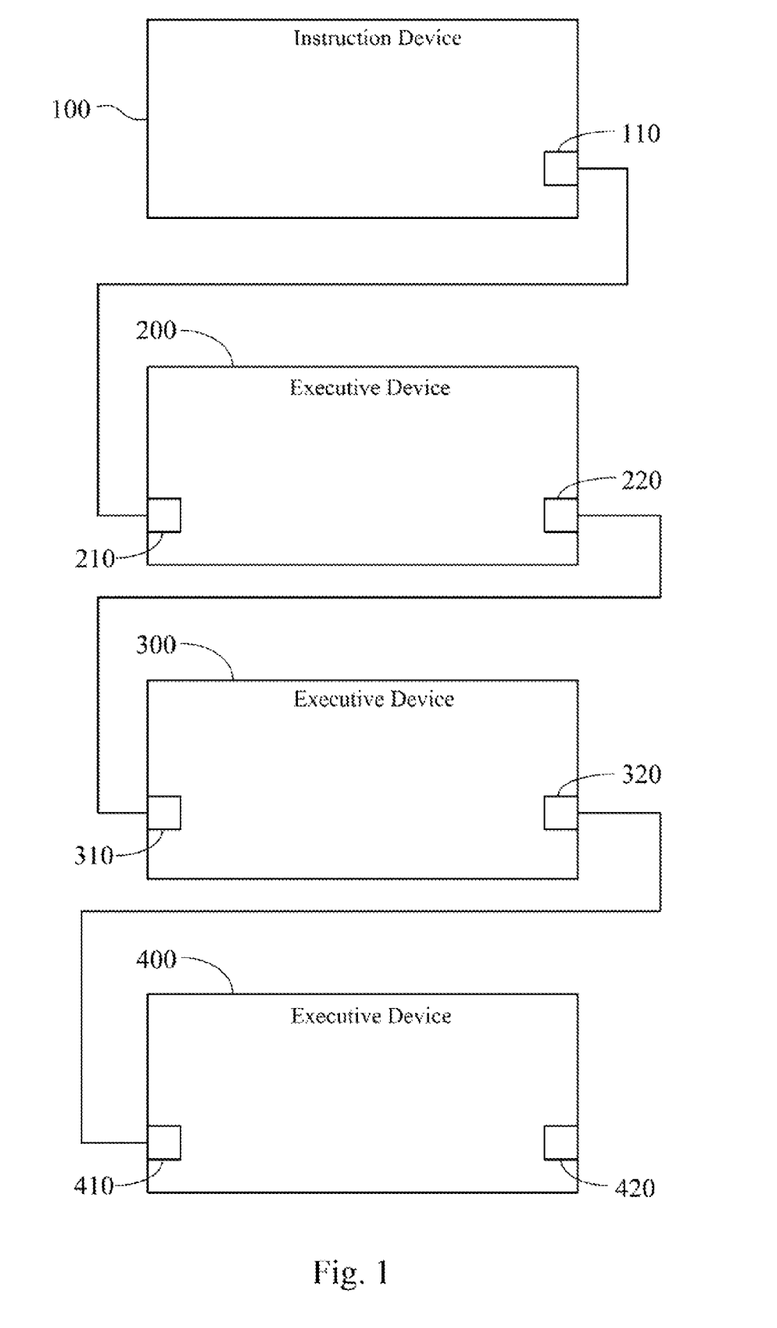
FIG. 1 is a schematic view of an embodiment of a stack system in the present invention.

FIG. 1 is a schematic view of an embodiment of a stack system for executive devices in the present invention. In this embodiment, an instruction device 100 and executive devices 200, 300, 400 of the stack system are serially connected as a stack, through connection ports 110, 210, 220, 310, 320, 410 and 420 on the instruction device and the executive devices. It should be noted that, the executive devices 200, 300, 400 in this embodiment each use a pair of connection ports among the connection ports 210, 220, 310, 320, 410, 420 for front and rear stack connection, but related pins described hereinafter of the present invention may also be integrated into a single connection port, or distributed into multiple connection ports, and the corresponding connection of each pin or pad in the connection ports may be integrally practiced by the combination of a cable and a connector or separately practiced by individually wiring. However, the present invention is not limited to this.

Figure 2:
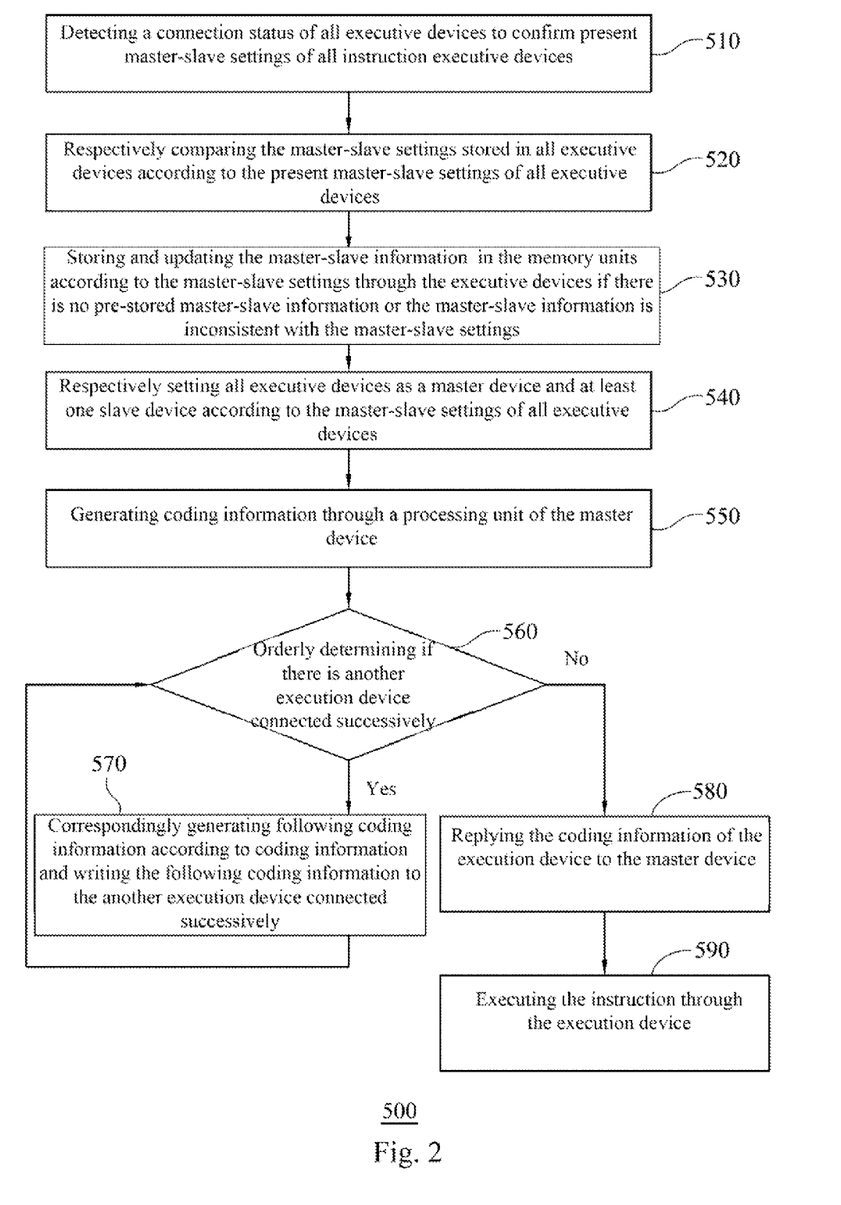
FIG. 2 is a flow chart of an embodiment of a stack method in the present invention.

FIG. 2 is a flow chart of an embodiment of a stack method in the present invention. The stack method may be implemented through a program. The program may be stored in, but not limited to in the present invention, a readable recording medium, such as a read only memory (ROM) or a flash memory (FLASH), to enable the instruction device and the executive devices in the present invention to read the recording medium and then execute the stack method.

Figure 3:
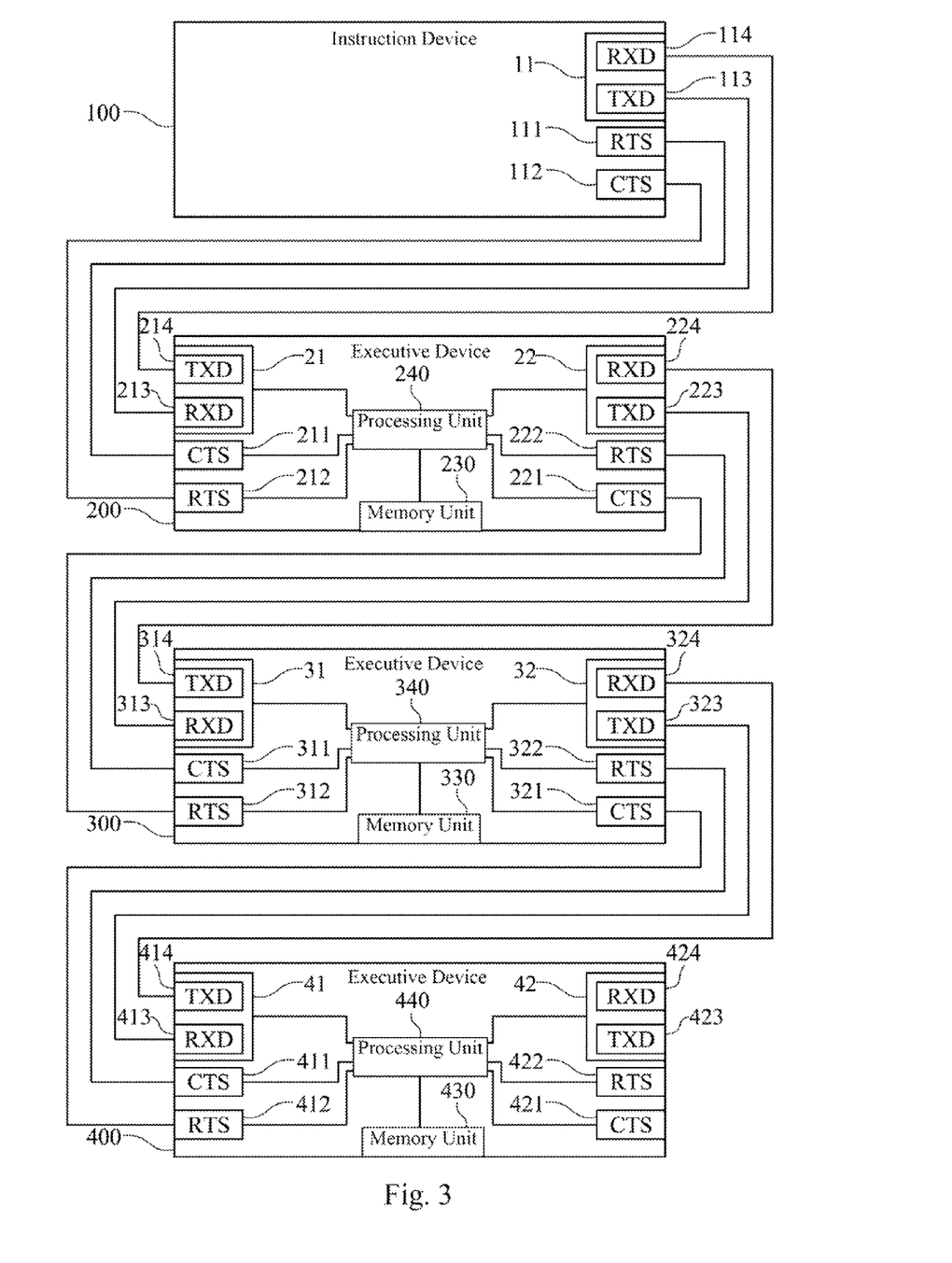
FIG. 3 is a block diagram of a stack system and executive devices in the present invention.

FIG. 3 depicts a function block diagram of a stack system and executive devices thereof in the present invention. References are made to FIGS. 1, 2 and 3. The stack method 500 in this embodiment includes the following steps: in step 510, a connection status is detected of each of the executive devices 200, 300, 400 to confirm a present a master-slave setting of each of the executive devices 200, 300, 400. In this step, the executive device 200 directly connected to the instruction device 100 is a master setting of the master-slave setting; and the rest executive devices 300 and 400 are set as a slave settings of the master-slave setting. Furthermore, processing units 240, 340, 440 of the executive devices 200, 300, 400 detect first pins 211, 311, 411 of the connection ports 210, 310, 410 to confirm the master-slave setting of the executive devices 200, 300, 400, and the technical content thereof will be described in details below.

In step 520, the master-slave information stored in the executive devices 200, 300, 400 is respectively compared according to the present master-slave setting of the executive devices 200, 300, 400. In this step, the master-slave information of the executive devices 200, 300, 400 is stored in the memory units 230, 330, 430 of the executive devices. In step 530, if there is no pre-stored master-slave information or the master-slave information is not consistent with the master-slave setting, the executive devices 200, 300, 400 store or update their master-slave information according to the master-slave setting. The memory units 230, 330, 430 in this embodiment may be, referred to the technical content of the readable recording medium described above, but the present invention is not limited to this.

In step 540, the executive devices 200, 300, 400 are set as a master device and at least one slave device according to the master-slave setting thereof. In another embodiment of the present invention, in step 510, the processing units 240, 340, 440 may further pre-read the master-slave information stored in the memory units 230, 330, 430 of the executive devices as the basis for setting a master and a slave executive device. However, the present invention is not limited to this. In other embodiments, the steps 520 and 530 may be omitted, and the master-slave setting of the executive devices 200, 300, 400 may be directly used as the basis for setting a master and a slave executive device in step 540.

In an embodiment of the present invention, the instruction device 100 may be a personal computer, a notebook computer, or other electronic devices that can transmit an instruction, etc; and each of the executive devices 200, 300, 400 may be a media player or network communication equipment. In addition, the executive devices may be of the same type or different types; and the connection ports 110, 210, 220, 310, 320, 410, 420 that are used for connection between the instruction device 100 and the executive devices 200, 300, 400, and between the executive devices 200, 300, 400 may be a universal asynchronous receiver/transmitter (UART) interface or an RS232 interface, or practiced by a general purpose I/O interface or a combination of pins of the above interfaces. However, the present invention is not limited to this. The connection pins or pads of the embodiments of the present invention are practiced by the pins or pads included in the above interfaces. The processing units 240, 340, 440 are components or modules with functions of data determination, operation, and access, such as a microcontroller or a chip set with such functions. However, the types of the executive devices and the processing units in the present invention are not limited to these.

In this embodiment, the connection pin 111 of the instruction device 100 is practiced by an RTS (Request to send) pin of the UART interface, and the first pins 211, 311, 411 of the executive devices 200, 300, 400 are practiced by a CTS (Clear to send) pin of the UART interface. Furthermore, in this embodiment, a control voltage level on the connection pin 111 is set as a low-level logical signal, such as a grounding (GND) voltage level, and a first voltage level on the first pins 211, 311, 411 is set as a high-level logical signal, such as a power (VCC) voltage level. However, since the present invention is not limited to this, the level values on the connection pin 111 and on the first pins 211, 311, 411 may also be set in contrast to the above description or set with other level values. The technique used to set related voltage levels may be practiced by that each of the processing units 240, 340, 440 directly sets an output signal, or practiced by the way of circuit bias. However, the present invention is not limited to this In step 510 of this embodiment, the processing units 240, 340, 440 detect the voltage levels on the first pins 211, 311, 411 to confirm the present master-slave setting of the executive devices 200, 300, 400. If the connection to pin 111 of the instruction device 100 is connected to the first pin 211 of the executive device 200, the control voltage level on the connection pin 111 will change the original first voltage level on the first pin 211. Thus, it can be determined that the executive device 200 is a master setting. If the first pins 311, 411 of the executive devices 300, 400 are not connected to the instruction device 100, and the original first voltage levels on the first pins are retained, it can be determined that the executive devices 300, 400 are the slave settings. In this step, the technique used to retain the original first voltage levels on the first pins 311, 411 may be that the first pins are kept open, i.e. the first pins are not connected to any device to retain the first voltage level; or that the first pins are connected to a pin with the same high logical level. For example, the forth pins 222, 322, 422 of the executive devices 200, 300, 400 are practiced by an RTS pin of the UART interface in this embodiment, and then the same first voltage level is set on the pins, such that the original first voltage level on the first pins 311, 411 can be retained as connected to the forth pins 222, 322 of the previous-stage executive devices 200, 300. However, the present invention is not limited to this. Therefore, in step 540, the executive device 200 is set as the master device, and the executive devices 300, 400 are set as the slave devices.

In step 550, the processing unit 240 of the master device 200 generates a coding information, wherein the coding information includes the master-slave setting and the connection sequence setting of all executive devices, and even the information of executive device types. Since the master device 200 is directly connected to the instruction device 100, and the master device 200 has a primary sequence and a major position among all executive devices, the master devices 200 firstly generates the coding information. For example, the content of the coding information may be 0, (M,1), or (M,1, 1). However, the content and format of such coding information are not limited in the present invention. All information are enough to determine the master-slave setting, the connection sequence setting, and even the types or numbers of the executive devices are included therein.

In step 560, it is determined if there is another execution device connected successively to each of the executive devices 200, 300, 400. In this embodiment, all second pins 221, 321, 421 are practiced by a CTS pin of the UART interface, and all third pins 212, 312, 412 are practiced by an RTS pin of the UART interface. Furthermore, in this embodiment, a second voltage level on all second pins 221, 321, 421 is set as a high-level logical signal, and a third voltage level on all third pins 212, 312, 412 is set as a low-level logical signal. However, with respect to the technique described above, the pin form and level settings of the pins of the present invention are not limited to this.

In this embodiment, a voltage level change on the second pins 221, 321, 421 is detected by the processing units 240, 340, 440 to confirm if there is another executive device connected successively to the executive devices 200, 300, 400. If there are other executive devices 300, 400 connected successively to the executive devices 200, 300, the original second voltage level of the second pins 221, 321 of the executive devices 200, 300 will be changed by the third voltage level of the third pins 312, 412 because the second pins 221, 321 are connected to the third' pins 312, 412 of the successive executive devices 300, 400. Since there is no execution device connected successively to the executive device 400 such that its second pin 421 can retain the original second voltage level.

In step 570, if there is another executive device connected successively to the current executive device, the executive devices 200, 300 that have a successive executive device generate a following coding information according to its coding information and write the following coding information to the execution devices 300, 400 connected successively as the coding information thereof.

In the stack method 500 of the present invention, it begins from the master device 200 to generate the following coding information according to coding information generated by the master device. Then, based on the connection sequence of the execution devices, the following coding information is transmitted, via a second data pin 22 of the master device, to a first data pin 31 of the execution device connected successively, so as to write the following coding information to the executive device 300 connected successively as the coding information of the executive device 300. The executive device 300 also generates other following coding information by the coding information it receives. Then, the following coding information is transmitted, via a second data pin 32 of the executive device 300, to a first data pin 41 of the successive executive device 400 as its coding information. In this embodiment, the content of the following coding information is generated according to the coding information of the current executive device. For example, the aforesaid master device respectively generates the following coding information of 1, (S,1), or (S,1,2). That is, the executive devices 200, 300 can generate the following coding information by adding 1 to the content of their coding information. However, the present invention is not limited to this.

In addition, in this embodiment, a data pin and a data pad may also be practiced by a pin of the RS232, the GPIO or other interfaces to transmit the following coding information and other information. For example, in this embodiment a data pin 11, the first data pins 21, 31, 41, and the second data pins 22, 32, 42, etc. are practiced by interconnecting receiving ends (RXD) and transmitting ends (TXD) in pairs in the RS232 interface. That is, the data pin 11 includes a transmitting end 113 and a receiving end 114; the first data pins 21, 31, 41 respectively include receiving ends 213, 313, 413 and transmitting ends 214, 314, 414; and the second data pins 22, 32, 42 respectively include receiving ends 224, 324, 424 and transmitting ends 223, 323, 423. However, in other embodiments of the present invention, information transmission in the data pin 11 and the data pins 21, 22, 31, 32, 41, 42, etc. may also be practiced by a single end of the data pin, such as a technique of a serial data line (SDA) in an inter-integrated circuit (I²C), instead of receiving ends and transmitting ends in pairs. However, the settings of the data pin and the pins are not limited to this in the present invention.

In step 580, if it is determined that no executive device is connected successively to an executive device in this embodiment, such as the executive device 400, the executive device 400 replies its coding information to the master device 200 as an end coding information. Thus, the connection of all executive devices 200, 300, 400 can be simply achieved, the master-slave settings of all executive devices can be auto-identified, and the corresponding coding information settings are achieved, only by a simple connection interface, such as the UART, without using complex communication protocols, such as the USB protocol.

Furthermore, in step 590, an instruction is executed by the executive devices 200, 300, 400. In this embodiment, the transmitting end 113 of the data pin 11 of the instruction device 100 is used to transmit an executive instruction to the receiving end 213 of the first data pin 21 of the master device 200. The processing unit 240 of the master device 200 receives the executive instruction and encodes the executive instruction according to the end coding information, for example, by adding the coding information, such as a header mark, into the content of the executive instruction to be a coding instruction.

As described above, the processing unit 240 can get the quantity and sequence of all executive devices of the entire stack system based on the end coding information, and can further encode the instruction to be executed by each executive device to form the coding instruction. As a result, the processing unit of each executive device can decode the coding instruction according to the present coding information thereof so as to identify and execute a right portion of the coding instruction to be executed by the processing unit. Then, the rest portions not to be executed by the processing unit will be passed to their corresponding executive devices. It should be noted that, the executive instruction in the present invention may be integral data, which is encoded and passed to respective executive devices for processing with division, such as video-audio data displaying contents of different channels at multiple players in parallel. Alternatively, the executive instruction in the present invention may also be independent data, which is encoded and then only decoded by a particular executive device, such as being transmitted via a particular network device. In addition, in this embodiment, the coding instructions that are passed by the master device 200 to other executive devices may only include a portion of coding instructions corresponding to other executive devices 300, 400, or may be an integral coding instruction which is respectively decoded by other executive devices 300, 400 such that the executive devices 300, 400 can take and execute their corresponding portions. However, the present invention is not limited to this.

In this embodiment, the processing unit of the master device 200 decodes and executes its corresponding coding instruction according to the coding information of the master device, and passes the coding instruction respectively corresponding to the other executive devices 300, 400 via the second data pin 22 of the master device 200 to the successive slave device 300. The slave executive device 300 receives the coding instruction, and then the processing unit 340 of the slave executive device 300 also decodes and executes its corresponding coding instruction according to the coding information of the slave device 300 itself, and continues to pass the coding instruction corresponding to the other executive device via the second data pin 32 of the slave executive device 300 to the successive slave device 400, and so on until all coded instructions are passed to all corresponding executive devices 200, 300, 400.

Thus, the instruction device 100 only needs to be equipped with a simple connection interface, and to be connected to an executive device 200 via the connection port 110 on the interface. All executive devices are also serially interconnected via the interface to form a stack. Thus, the instruction device 100 can command multiple serially stacked executive devices 200, 300, 400 connected successively to execute the instruction from the instruction device 100 simultaneously. Due to this, the instruction device 100 may be supported by a plurality of executive devices without a plurality of connection interfaces.

In addition, the instruction device 100 may also transmit a reading instruction by the transmitting end 113 of the data pin 11 to the receiving end 213 of the first data pin 21 of the master device 200. The processing unit 240 of the master device 200 transmits the end coding information by the transmitting end 214 of the first data pin 21 to the receiving end 114 of the data pin 11 of the instruction device 100. As a result, the instruction device 100 can determine a stack aspect of the present stack system, such as the quantity and type of the executive devices, according to the end coding information, to generate the corresponding executive instruction. In other embodiments of the present invention, the executive instruction generated and transmitted by the instruction device 100 may also be the coding instruction previously encoded by the instruction device 100 according to the end coding information. However, the present invention is not limited to this.

In another embodiment of the present invention, the processing units 240, 340, 440 of all executive devices 200, 300, 400 further detect the voltage level change on the second pins 221, 321, 421 thereof to confirm if there is a change on the following connection status such as adding or removing). When the executive device detects a connection status change, steps 510-580 are repeated. The technical content of this embodiment is similar to that of the above embodiments, if the executive device 400 is newly docked to another executive device successively, the second voltage level on the second pin 421 of the executive device 400 will change according to a third voltage level on a to third pin of the newly docked executive device. If the executive device 400 connected successively to the executive device 300 is pulled out, the second pin 321 of the executive device 300 will return to a default second voltage level. Thus, a hot-swapping detection function can also be provided without complex communication protocols.

In addition, in some embodiments of steps 570 and 590, the step that the executive device 200 passes the following coding information or the coding instruction to the executive device 300 connected successively further includes that the executive device 200 firstly transmits a start-to-write signal via the transmitting end 223 of the second data pin 22 of the executive device 200 to the receiving end 313 of the first data pin 31 of the executive device 300. After the executive device 300 receives the start-to-write signal, a start confirmation signal is transmitted via the transmitting end 314 of the first data pin 31 of the executive device 300 to the receiving end 224 of the second data pin 22 of the executive device 200. After the executive device 200 receives the start confirmation signal, the following coding information or the coding instruction is transmitted, according to the aforesaid connection relations, via the second data pin 22 of the executive device 200 to first data pin 31 of the executive device 300, in order to rite the following coding information or the coding instruction into the memory unit 330 of the successive executive device 300. After the executive device 300 receives and stores the following coding information or the coding instruction, a receive confirmation signal and an end signal are transmitted via the third data pin 31 of the executive device 300 to the second data pin 22 of the previously connected executive device 200. After the executive device 200 receives the receive confirmation signal and the end signal, a write confirmation signal is transmitted via the second data pin 22 of the executive device 200 to the first data pin 31 of the executive device 300, so as to complete a data transmission process. By the same way, in this embodiment, the data transmissions between other devices and the end coding information reply are similar to that described above in steps and techniques, so they will not be repeated here.

In other embodiments of the present invention, it further includes that if an executive device, such as the executive device 400, does not receive any replied confirmation signal because no executive device is connected successively to the executive device 400, or the successive device runs into a problem, the coding information of the executive device 400 will be replied via the third data pin 41 thereof to the master device 200 as the end coding information. The reply of the end coding information is similar to the content described above, so it will not be repeated here.

In one embodiment of the present invention, the successive executive device can further determine if the coding information received by the executive device is correct or not. For example, in this embodiment, the successive executive device 300 receives the following coding information from the executive device 200 by the receiving end 313 of the first data pin 31 of the executive device 300, and compares the following coding information to the master-slave information stored in the memory unit 330 by the processing unit 340 of the executive device 300. If the following coding information received does not match the master-slave information of the executive device 300, for example, the master-slave setting, the device type or the number limitation is incorrect, the executive device 300 transmits a writing error signal by the to transmitting end 314 of the first data pin 31 thereof to the receiving end 224 of the second data pin 22 of the previously connected executive device 200, such that the executive device 200 can repeat step 570. Thus, the correct passing of the coding information between all executive devices, such as between the executive device 200 and the executive device 300, can be ensured.

In another embodiment of the present invention, a previously connected executive device, such as the executive device 200, may also used to determine if the following coding information received by the successively connected executive device 300 is correct or not. The successive executive device 300 transmits the following coding information received thereof by the transmitting end 314 of the first data pin 31 of the executive device 300 to the receiving end 224 of the second data pin 22 of the executive device 200. Then, the executive device 200 is used to determine if the following coding information of the successive device is correct or not. If the following coding information received by the successive executive device 300 is incorrect, the executive device 200 will execute step 570 again. Thus, the correct passing of the coding information between all executive devices, such as between the executive device 200 and the executive device 300, can be ensured.

The present invention can, in addition of avoiding complex communication protocols, achieve the identification and the settings of a plurality of stacked executive devices. Furthermore, the instruction device can command multiple serially stacked executive devices to execute an instruction simply by being equipped with a single interface to connect to one of all executive devices, without using a plurality of connection interfaces.

Although the present invention has been disclosed with reference to the above embodiments, these embodiments are not intended to limit the present invention. It will be apparent to those skilled in the art that various modifications and variations can be made without departing from the scope or spirit of the present invention. Therefore, the scope of the present invention shall be defined by the appended claims.

What is claimed is:

1. A control method, applied in an instruction device and a plurality of executive devices, comprising:
    (a) detecting a master-slave setting in each of the executive devices to set one of the executive devices as a master device and the other executive devices as slave devices;
    (b) generating a coding information by the master device; and
    (c) processing the coding information by determining if there is another executive device connected successively to each of the executive devices, to process the coding information;
    wherein, if there is another executive device connected successively, the executive device generates a following coding information according to the coding information thereof and writes the following coding information to the another executive device connected successively as the coding information of the another executive device; and if there is no other executive device connected successively, the executive device sends back the coding information of the executive device to the master device as an end coding information.

2. The control method of claim 1, wherein the step (a) further comprises:
    reading a master-slave information stored in each of the executive devices to set each of the executive devices as the master device or one of the slave devices; wherein
    if the master-slave information is not stored in the executive device, storing the master-slave setting as the master-slave information; and
    if the master-slave information does not match the master-slave setting, updating the master-slave information with the master-slave setting.

3. The control method of claim 1, wherein the detection of the master-slave setting of each of the executive devices in the step (a) further comprises:
    setting a control voltage level on a connection pin of the instruction device and a first voltage level on a first pin of each of the executive devices; and
    detecting a voltage level on the first pin of each of the executive devices;
    wherein, if the connection pin is connected to the first pin such that the first voltage level is changed by the control voltage level, determining the master-slave setting of the executive device to be a master setting; if the first voltage level keeps unchanged, determining the master-slave setting of the executive device to be a slave setting.

4. The control method of claim 1, wherein the step (c) further comprises:
    setting a second voltage level on a second pin of each of the executive devices and a third voltage level on a third pin of each of the executive devices; and
    detecting a voltage level on the second pin of each of the executive devices;
    wherein, if the second pin of the executive device is connected to the third pin of the another executive device such that the second voltage level is changed by the third voltage level, determining that there is the another executive device connected successively to the executive device; and if the second voltage level keeps unchanged, determining that there is no another executive device connected successively to the executive device.

5. The control method of claim 4, further comprising:
    detecting a connection status of each of the executive devices, wherein the step of detecting the connection status of each of the executive devices comprises:
    if the second voltage level on the second pin of the executive device is changed to the third voltage level, determining that the executive device is newly connected to the another executive device;
    if the second pin returns to the second voltage level from the third voltage level, determining that the other executive device is newly disconnected from the executive device;
    wherein, if the connection status of the another executive device is changed, repeating the steps (a), (b) and (c).

6. The control method of claim 1, wherein the step (c) further comprises:
    transmitting a start-to-write signal to the another executive device from the executive device;
    transmitting a start confirmation signal to the executive device from the another executive device;
    writing the following coding information to the another executive device from the executive device;
    transmitting a receive confirmation signal and an end signal to the executive device after receiving and storing the following coding information by the another executive device;
    transmitting a write confirmation signal to the another executive device from the executive device;
    sending back the coding information of the executive device to the master device as the end coding information, if the executive device does not receive the start confirmation signal;
    comparing the following coding information to the master-slave information through the another executive device; wherein
    if the following coding information does not match the master-slave information, the another executive device transmits a writing error signal to the executive device, such that the executive device repeats the step (c).

7. The control method of claim 6, further comprising:
    transmitting the received following coding information to the executive device through the another executive device; and
    determining if the following coding information is correct through the executive device;
    repeating the step (c) through the executive device, if the following coding information received by the another executive device is incorrect.

8. The control method of claim 1, further comprising:
    transmitting an executive instruction to the master device through the instruction device;

coding the executive instruction as a coding instruction according to the end coding information through the master device;

correspondingly decoding and executing the coding instruction according to the coding information, or passing the coding instruction to the another executive device connected successively through the executive device;

transmitting a reading instruction to the master device through the instruction device;

transmitting the end coding information to the instruction device through the master device; and generating the executive instruction according to the end coding information through the instruction device.

9. An electronic system of executive devices, comprising:
an instruction device, comprising a connection pin and a data pin; and
a plurality of executive devices, each of the executive devices comprising a first pin, a second pin, a third pin, a first data pin, a second data pin, a memory unit, and a processing unit;
wherein, the processing unit is respectively connected to the memory unit, the first pin, the second pin, the third pin, the first data pin, and the second data pin; one of the executive devices that is connected to the instruction device is a master device, and the other executive devices are slave devices; the first pin and the first data pin of the master device are respectively connected to the connection pin and the data pin of the instruction device, and the second pin and the second data pin of the master device are respectively connected to the third pin and the first data pin of one of the slave devices; the second pin and the second data pin of each of the slave devices are respectively connected to the third pin and the first data pin of another slave device; the processing unit of the master device generates a coding information and stores the coding information in the memory unit thereof, and the processing units of each of the executive devices further detects the second pin to confirm if there is another executive device connected successively; if there is the another executive device connected successively, the executive device generates a following coding information according to the coding information thereof and writes the following coding information via the second data pin thereof to the another executive device connected successively to be the coding information of the another executive device; if there is no other executive device connected successively, the executive device sends back the coding information thereof via the first data pin thereof to the master device as an end coding information.

10. The electronic system of claim 9, wherein the processing unit of each of the executive devices further reads a master-slave information stored in the memory unit, and sets each of the executive devices as the master device or one of the slave devices according to the master-slave information respectively.

11. The electronic system of claim 9, wherein the processing unit of each of the executive devices further detects the second pin; if a voltage level of the second pin is changed, the processing unit determines that there is another executive device connected or disconnected, the electronic system passes the following coding information to the another executive device connected successively again, beginning from the master device.

12. The electronic system of claim 9, wherein the instruction device transmits an executive instruction via the data pin to the master device, and the processing unit of the master device encodes the executive instruction as a coding instruction according to the end coding information and decodes the coding instruction according to the coding information thereof to correspondingly execute the coding instruction; wherein, if there is another executive device connected successively to the executive device, the executive device passes the coding instruction to the another executive device, and the another executive device decodes the coding instruction according to the coding information thereof to correspondingly execute the coding instruction; wherein, the instruction device transmits a reading instruction via the data pin to the master device, and the processing unit of the master device transmits the end coding information via the first data pin to the instruction device, and then the instruction device generates the executive instruction according to the end coding information.

13. An executive device, comprising:
a first pin;
a second pin;
a third pin;
a memory unit; and
a processing unit;
wherein the processing unit is respectively connected to the memory unit, the first pin, the second pin, and the third pin; the processing unit respectively sets a first voltage level on the first pin, a second voltage level on the second pin, and a third voltage level on the third pin; and the processing unit further detects the first pin and the second pin; if the voltage level on the first pin is changed, the processing unit sets the executive device as a master device, generates a coding information, and stores the coding information in the memory unit; if the first voltage level keeps unchanged, the processing unit sets the executive device as a slave device; the processing unit further correspondingly stores a master-slave setting in the memory unit; if the voltage level of the second pin is changed to the third voltage level, the processing unit determines that there is another executive device connected successively to the executive device; and if the second voltage level keeps unchanged, the processing unit determines that there is no executive device connected successively to the executive device.

14. The executive device of claim 13, further comprising:
a first data pin; and
a second data pin;
wherein, the first data pin and the second data pin are respectively connected to the processing unit; if there is another executive device connected successively to the executive device, the executive device generates a following coding information according to the coding information thereof to the second data pin thereof, and the another executive device receives the following coding information from the first data pin thereof and stores the following coding information to be the coding information thereof; if the executive device is the slave device and there is no executive device connected successively to the executive device, the executive device sends back the coding information thereof via the first data pin to the master device to be an end coding information.

15. The executive device of claim 14, wherein the master device further receives an executive instruction from the first data pin, encodes the executive instruction as a coding instruction according to the end coding information, and decodes the coding instruction according to the coding information thereof to correspondingly execute the coding instruction; if there is another executive device connected successively to the executive device, the executive device passes the coding instruction to the another executive device, and the another executive device decodes the coding instruction according to the coding information thereof to correspondingly execute the coding instruction.

16. The executive device of claim 14, wherein the master device further receives a coding instruction from the first data pin, and the master device decodes the coding instruction according to the coding information thereof to correspondingly execute the coding instruction; if there is another executive device connected successively to the executive device, the executive device passes the coding instruction thereof to the another executive device, and the another executive device decodes the coding instruction according to the coding information thereof to correspondingly execute the coding instruction.

* * * * *